G. E. SHINE.
BOX.
APPLICATION FILED JAN. 16, 1913.
1,070,194.
Patented Aug. 12, 1913.
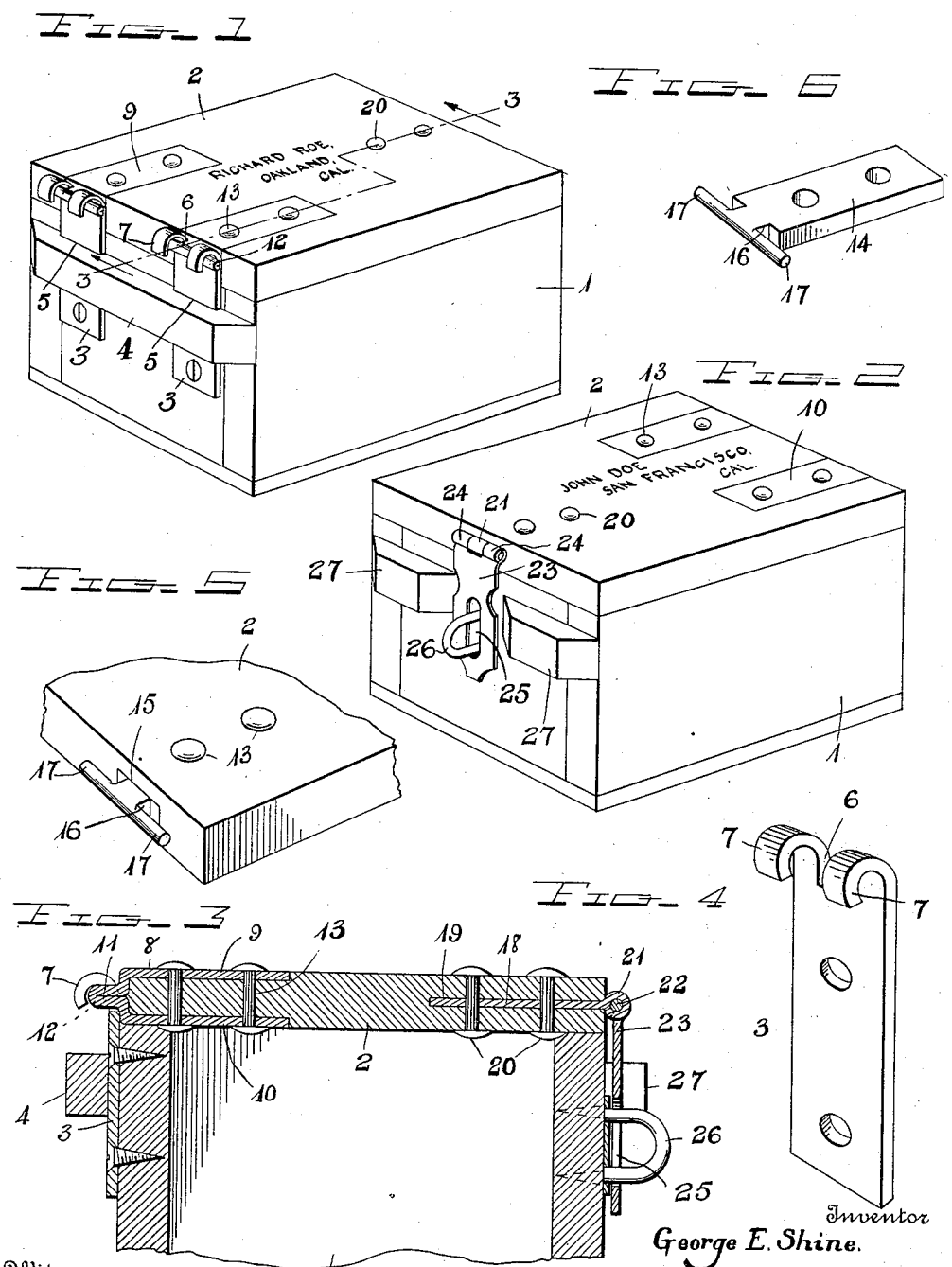
Inventor
George E. Shine.
Witnesses
E. D. Haines
C. E. Hunt
By H. R. Williamson & Co.
Attorneys

UNITED STATES PATENT OFFICE.

GEORGE E. SHINE, OF WOODSIDE, CALIFORNIA.

BOX.

1,070,194.  Specification of Letters Patent.  Patented Aug. 12, 1913.

Application filed January 16, 1913. Serial No. 742,501.

*To all whom it may concern:*

Be it known that I, GEORGE E. SHINE, a citizen of the United States, residing at Woodside, in the county of San Mateo and State of California, have invented certain new and useful Improvements in Boxes; and I do declare the following to be a full, clear, and exact description of the invention, such as will enable others skilled in the art to which it appertains to make and use the same.

This invention relates to improvements in boxes and particularly to boxes having removable and reversible covers.

One object of the invention is to provide a box having a removable and reversible cover and an improved construction and arrangement of hinges for detachably and reversibly hinging the cover to the box.

With this and other objects in view, the invention consists of certain novel features of construction, and the combination and arrangement of parts as will be more fully described and claimed.

In the accompanying drawings: Figure 1 is a perspective view of a box and cover constructed in accordance with my invention; Fig. 2 is a similar view looking toward the opposite end of the box from that shown in Fig. 1; Fig. 3 is an irregular cross section of the box and cover taken on the line 3—3 of Fig. 1; Fig. 4 is a perspective view of the box member of one of the hinges for connecting the cover to the box; Fig. 5 is a similar view of a portion of the cover and the outer end of a slightly different form of cover member of one of the hinges; Fig. 6 is a perspective view of the cover member of the hinge shown in Fig. 5.

Referring more particularly to the drawings 1 denotes my improved box which may be of any desired size and any suitable shape and 2 denotes the cover which is hingedly and removably attached to the box to permit the cover to be taken off and reversed when desired. To one end of the box are secured the box members 3 of the hinge connection for the cover, said box members comprising plates which are screwed or otherwise firmly secured to the end of the box and which are further held in position thereon by a cleat 4 which is secured to this end of the box across the plates of the hinge members 3 and which is notched in its inner edge as shown at 5 to receive the hinge members. The upper ends of the plates 3 are notched inwardly as at 6 to form parallel lugs which are bent outwardly and downwardly to provide pintle receiving hooks 7 with which the pintles of the cover members of the hinge are detachably engaged when the cover 2 is in place on the box. The hinge members 3 are secured to the end of the box in such manner that the upper end and hooks 7 of the hinge members project above the upper edge of the box in position to receive the pintles of the hinge members of the cover.

The cover members 8 of the hinges are shown in Figs. 1, 2 and 3 of the drawings as comprising upper and lower parallel cover engaging plates 9 and 10 which are engaged with and are preferably countersunk in the upper and lower sides of the cover as clearly shown in the drawings. At the outer ends of the plates 9 and disposed in a plane midway between said plates are the connecting members of the hinges, said members comprising rearwardly extending lugs 11 on the ends of which are laterally extending pintles 12 which are adapted to be removably engaged with the hooks 7 on the box members 3 of the hinges.

The hinge members 8 are formed from a metal plate bent midway between its ends and notched inwardly from its opposite edges to form the lugs 11 and pintles 12 after which the ends of the plate are bent in opposite directions at right angles to the lugs 11 and are then bent longitudinally to form the parallel cover engaging plates 9 and 10 which are countersunk in the opposite sides of the cover and are rigidly secured thereto by rivets or other suitable fastening devices 13 as clearly shown in Fig. 3 of the drawings. In thus forming and attaching the hinge members 8 to the cover of the box it will be noted that the lugs 11 and pintles 12 are disposed in line with the center of the rear edge of the cover 2 of the box so that the pintles of the hinge members 8 may be readily engaged with the hooks 7 on the box members 3 of the hinges in whichever position the cover may be applied to the box or, in other words, by this construction and arrangement of the connecting parts of the hinges the cover may be reversed to bring either side thereof uppermost.

In Figs. 5 and 6 of the drawings is shown a slightly modified construction of the cover member of the hinges, said cover member in this instance comprising an attaching plate 14 which is adapted to be engaged with a mortise 15 in the rear edge of the cover of the box as clearly shown in Fig. 5 of the drawings. In the outer end of the plate 14 is an integral spacing lug 16 on which are formed laterally extending pintles 17 which are adapted to be engaged with the hooks 7 on the upper ends of the box members of the hinges. It will be noted that the mortise 15 is formed in the rear edge of the cover midway between the upper and lower sides thereof so that when the plate 14 of this hinge member is engaged therewith the pintles 17 will be disposed in a plane midway between the upper and lower sides of the cover which will permit the pintles 17 to be operatively engaged with the hook 7 of the box members irrespective to the position of the cover or to which side of the latter is uppermost.

Secured to the front edge of the cover is a hasp comprising an attaching plate 18 which is engaged with a mortise 19 formed in the front edge of the cover midway between the upper and lower sides thereof, said attaching plate 18 being secured in the mortise 19 by rivets or other suitable fastening devices 20. On the outer end of the plate 18 and projecting beyond the end thereof is a centrally disposed eye 21 with which is engaged the pivot pin 22 which pivotally connects the hinged or staple engaging member 23 of the hasp with the attaching plate. The hinged member 23 has formed on its upper end eyes 24 with which the ends of the pivot pin 22 are engaged and in the member 23 is formed the usual staple engaging slot 25 which when the hasp is in operative position engages the staple 26 in the end of the box so that when a padlock or other fastening is engaged with the staple the cover will be fastened in position on the box. The staple engaging member 23 of the hasp is in the form of a perfectly flat plate and by arranging the attaching plate midway between the upper and lower sides of the cover of the box the member 23 may be swung either way or in the proper direction for engaging the staple 26 irrespective of the position of the cover on the box. Secured to the end of the box on opposite sides of the hasp are short cleats 27 the ends of which are preferably beveled as shown, said cleats serving to guard or protect the hasp from being broken off or injured by the rough handling of the box. The cleat 4 on the opposite end of the box aside from forming a fastening means for the box members of the hinges also serves to guard and protect the hinges.

While my improved box and cover may be employed for any suitable purposes the same is particularly designed for use as a shipping box or crate and when so employed the name of the consignor may be placed on one side of the reversible cover and the name of the consignee placed on the opposite side of the cover so that when the box has been shipped to the consignee and the goods removed therefrom the cover may be reversed and will display the name and address of the consignor to whom the box is to be returned.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus particularly described my invention, what I claim is:

1. A box having a cover, reversible hinges to hingedly connect said cover with the box, said hinges comprising box members having hook shaped pintle receiving lugs and cover members having pintles disposed in a plane midway between the upper and lower sides of the cover and adapted to be engaged with the pintle receiving lugs on the box members of the hinges, whereby the cover may be hingedly connected to the box either side up, and a reversible fastening member carried by said cover and adapted to be employed for fastening the cover when either side thereof is uppermost.

2. A box having a cover, reversible hinges to hingedly connect said cover with the box, said hinges comprising box members having hook shaped pintle receiving lugs and cover members having pintles disposed in a plane midway between the upper and lower sides of the cover and adapted to be engaged with the pintle receiving lugs of the box members of the hinges, whereby the cover may be hingedly connected to the box either side up, a reversible fastening member carried by said cover and adapted to be employed for fastening the cover when either side thereof is uppermost, and cleats arranged on the ends of the box to protect said hinges and cover fastening thereof.

3. A box having a cover, reversible hinges to connect said cover and box, comprising a box engaging member having on its upper end hook shaped pintle receiving lugs disposed in a plane midway between the upper and lower sides of the cover, a cover member comprising upper and lower cover engaging plates adapted to be secured to the upper and lower sides of said cover and having at their outer ends an integral longitudinally extending spacing lug and laterally extending pintles projecting from opposite sides of said lug and disposed in a plane midway between the upper and lower sides of the cover, said pintles being adapted to be removably and reversibly engaged with the hook shaped lugs on the box member of the hinge whereby the cover of the box may be reversed and hingedly secured to the box with either side up.

In testimony whereof I have hereunto set my hand in presence of two subscribing witnesses.

GEORGE E. SHINE.

Witnesses:
  PERCY HILLEBRANCH,
  W. H. BARG.

Copies of this patent may be obtained for five cents each, by addressing the "Commissioner of Patents, Washington, D. C."